POSITION CONTROL OF TELEVISION IMAGES

Original Filed Aug. 1, 1951

5 Sheets-Sheet 1

INVENTOR.
Newhall Douglas
BY Irving Seidman
ATTORNEY

Nov. 29, 1960 N. DOUGLAS 2,962,547

POSITION CONTROL OF TELEVISION IMAGES

Original Filed Aug. 1, 1951 5 Sheets-Sheet 2

INVENTOR.
Newhall Douglas
BY Irving Seidman
ATTORNEY

POSITION CONTROL OF TELEVISION IMAGES

Original Filed Aug. 1, 1951 5 Sheets-Sheet 3

INVENTOR.
Newhall Douglas
BY Irving Seidman
ATTORNEY

Nov. 29, 1960 N. DOUGLAS 2,962,547

POSITION CONTROL OF TELEVISION IMAGES

Original Filed Aug. 1, 1951 5 Sheets-Sheet 4

INVENTOR.
Newhall Douglas
BY Irving Seidman
ATTORNEY

Nov. 29, 1960 N. DOUGLAS 2,962,547

POSITION CONTROL OF TELEVISION IMAGES

Original Filed Aug. 1, 1951

5 Sheets-Sheet 5

INVENTOR.
Newhall Douglas

BY Irving Seidman

ATTORNEY 2,962,547

POSITION CONTROL OF TELEVISION IMAGES

Newhall Douglas, 517 Sherwood Road, Hohokus, N.J.

Original application Aug. 1, 1951, Ser. No. 239,728, now Patent No. 2,822,720, dated Feb. 11, 1958. Divided and this application July 11, 1957, Ser. No. 671,257

6 Claims. (Cl. 178—6)

The present invention relates to the projection and reproduction of pictures or images, especially in such manner that the projected image is represented in its true aspect and hence is suitable to be employed as a picture or scenic background in connection with various photographic as well as television techniques. This application is a division of my copending application Ser. No. 239,-728, filed August 1, 1951, now Patent No. 2,822,720.

A principal object of the invention is to reproduce objects and original scenes in picture or image form so that the objects or successive scenes are projected as pictures or images in locations corresponding relatively to the locations of the respective objects or scenes as they originally occurred, and also preferably so that the objects stationary when originally viewed appear stationary in the projected pictures. Additional objects of the invention will be apparent from the description to follow.

In connection with the production of motion pictures and television programs, especially from studios, the provision of suitable backgrounds becomes a problem. Studio backgrounds are usually provided as paintings on a backdrop or cyclorama, or in the form of other types of scenery; but these are expensive, cumbersome and limited as to subject matter and application. Therefore, if a background of considerable magnitude, as for example, a well-known street including a number of buildings, or other scenes extending over a large distance, be required, it is customary to transport actors, vehicles, etc., to the actual location and to make the picture "on location." This involves considerable time and expense because it also requires transportation of a crew of technicians and much equipment.

In an effort to decrease such expenditure of time and money, it has been proposed to take motion or still pictures of the desired scene on photographic film or plates, and then to project the images from the film or plates on a screen to comprise the background. New action such as actors, vehicles, etc., is then placed between a camera and the projected images on the screen, and a composite motion picture taken using the projected picture on the screen as the background.

Such expedient has heretofore been successful only to a small extent because if the projected image is in the form of a still picture it can encompass only a small field of view, and no motion can occur in the background. On the other hand, if the background comprises the projected image of a motion picture covering an extended scene, it will include a succession of views photographed by a motion picture camera which was moved in order to include the extended area of scenery. If such projected pictures are rephotographed according to procedures heretofore known, an unnatural or unreal effect will result. This lack of reality is due to the fact that the extended scene must be photographed by either "panning," viz., turning the camera in translation along a straight or curved line such, for example, as in the case of a camera carried along a street in a truck. If a film thus taken is reproduced section-by-section by projection from a stationary projector on a stationary projection surface or screen, as has heretofore been the practice, objects in the picture such as houses and trees, for example, which were stationary when photographed will appear to move across the screen in the projected picture at the rate at which the camera moved when the pictures were taken. Cameras are also employed in a third manner known as "dollying" in which the camera is moved toward or away from the scene being photographed, with the result that stationary objects in the picture appear to move due to change in perspective. Obviously projected pictures of the foregoing nature cannot be satisfactorily employed as a scenic background either for television productions, or for general theatre use.

Again, it is sometimes desirable that an actor or other object be shown moving along a street, or the like, in which event the moving object should appear to be passing stationary objects in the background. In this case, also, a motion picture or moving "still" picture as heretofore employed cannot be satisfactorily used as a background because the objects shown in the background which should appear to be stationary, will appear to move, thus incorrectly modifying the apparent motion of the object in the foreground which is actually moving.

In accordance with the present invention all of the disadvantages above referred to, as well as many additional disadvantages of the prior practices and techniques, are overcome.

In brief, the invention comprises method and means for projecting a film or plate, which may have been originally taken in the customary manner, by moving the projector simultaneously, and preferably so as exactly to duplicate, the movement of the camera while the film or plate was being exposed. This will result in such movement or location of the projected images in space that the successive images appear on projection areas which bear the same spatial relations to each other as did the objects originally photographed. Consequently, the objects will appear in their correct positions, and objects stationary when photographed will appear stationary on the screen. To achieve an accurate reproduction of an original scene by projection of a succession of images thereof, it is, in brief, necessary that the projector follow the same modes of movement, or assume the same aspects which the camera followed or assumed in respect to the same sections of film.

A screen suitable to receive such projected images may be sufficiently large to accommodate them or, more conveniently, the screen itself may be arranged to move synchronously with the area of the projected image. The screen may comprise a plane or a curved surface (cylindrical or spherical) or a combination of plane and curved surfaces. Film taken by camera movement along a straight line can by the present invention be projected on a curved surface and vice-versa.

In rephotographing the scene, as when the projected picture is employed as a background, it is usually desirable that the camera so used be moved in substantial synchronism with the movement of the projection area on the screen.

The required correlation of movement between the projector, the screen and the camera may be achieved by several methods, including manual, or mechanical, or by self-synchronous electric motor mechanisms, or by means of records and servo-mechanisms in a manner later to be described.

The method and apparatus in accordance with the invention will be more clearly understood from the following description considered in connection with the drawings in which.

Figures 8, 9, 10:
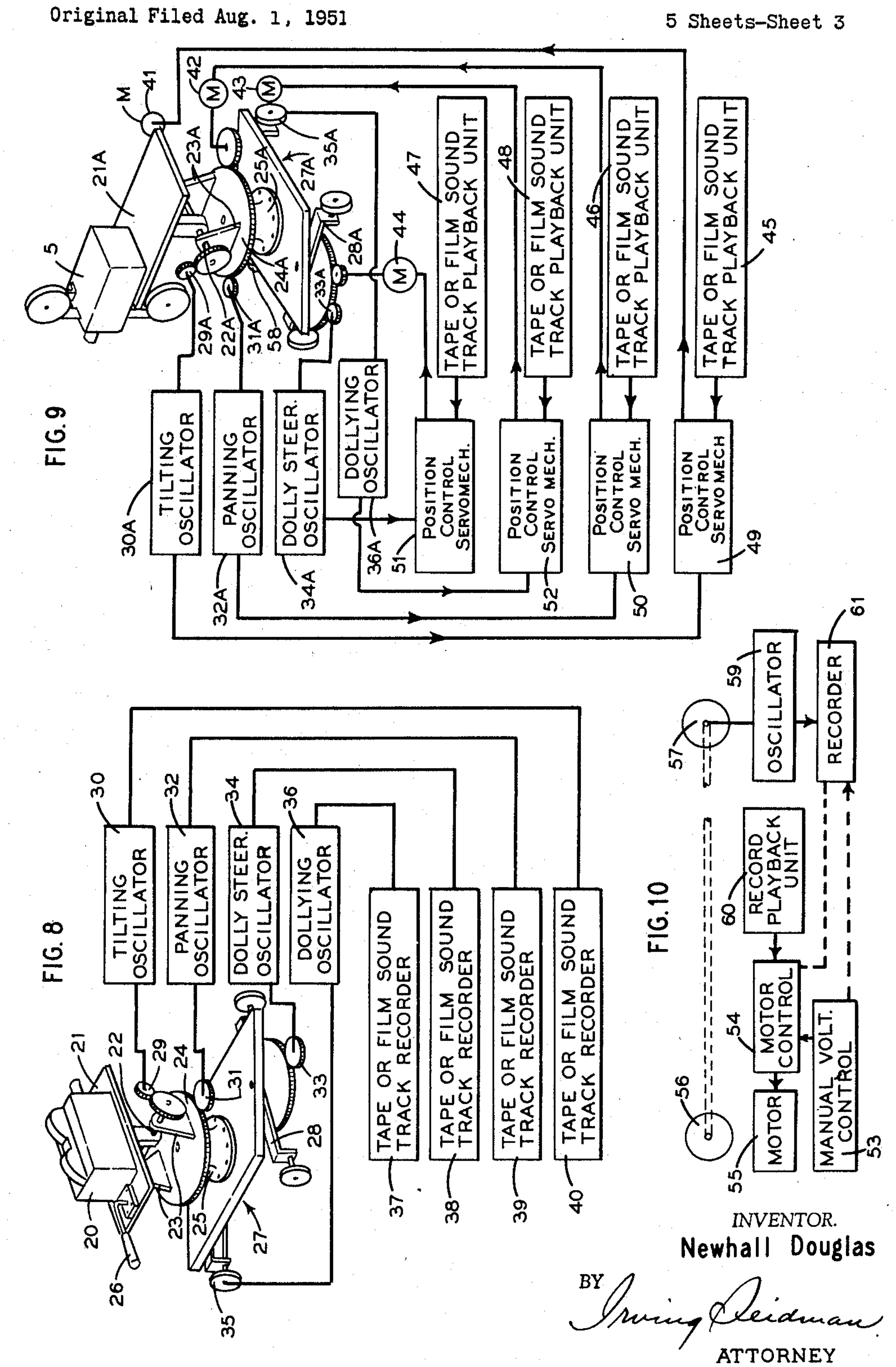
Figure 11:
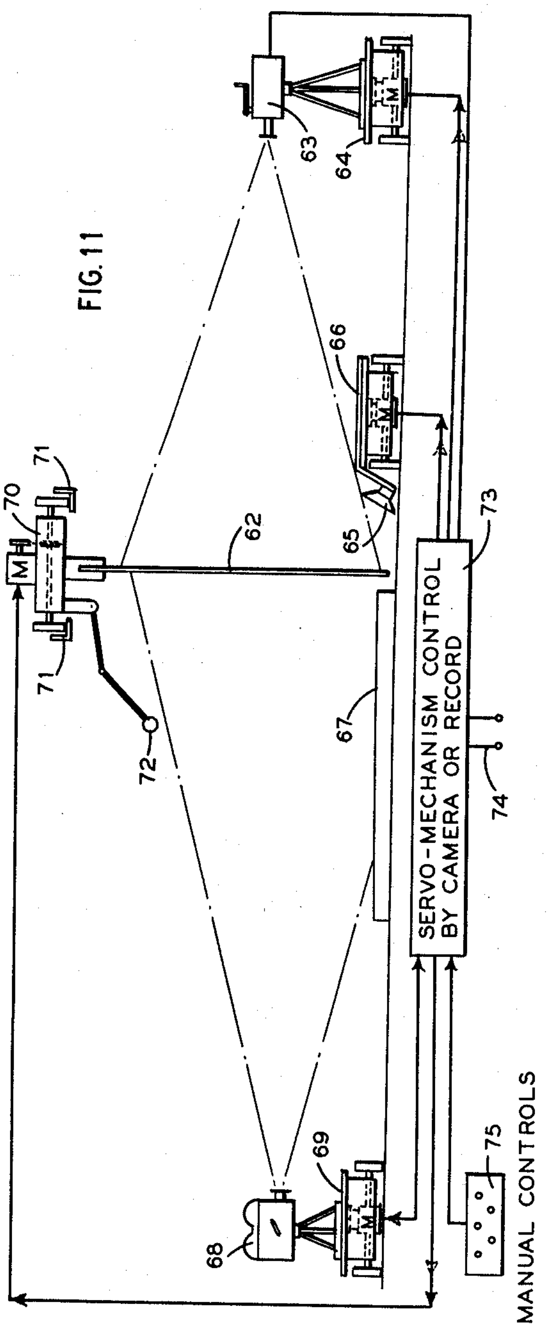
Figure 12:
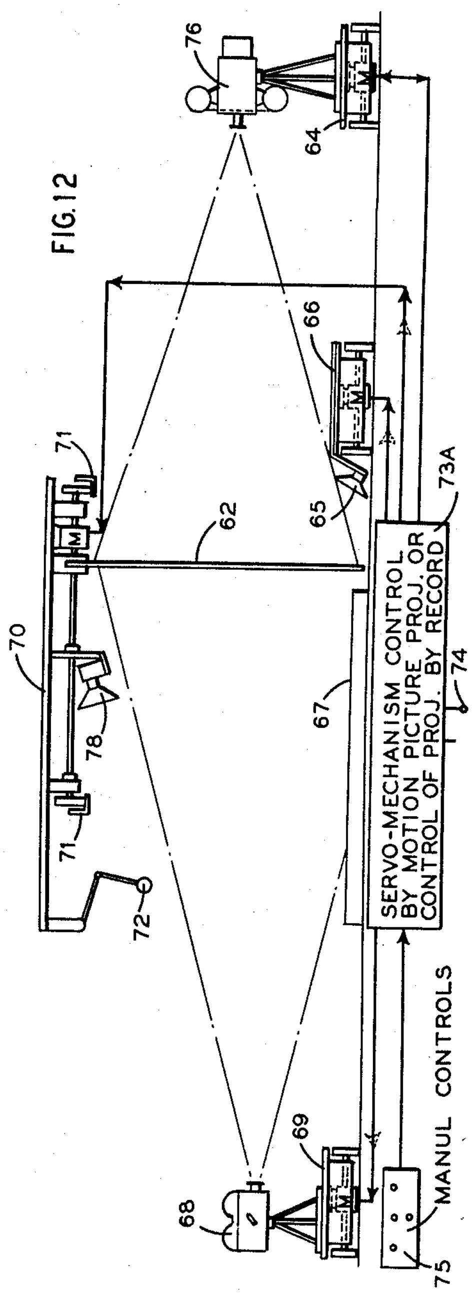
Figure 13:
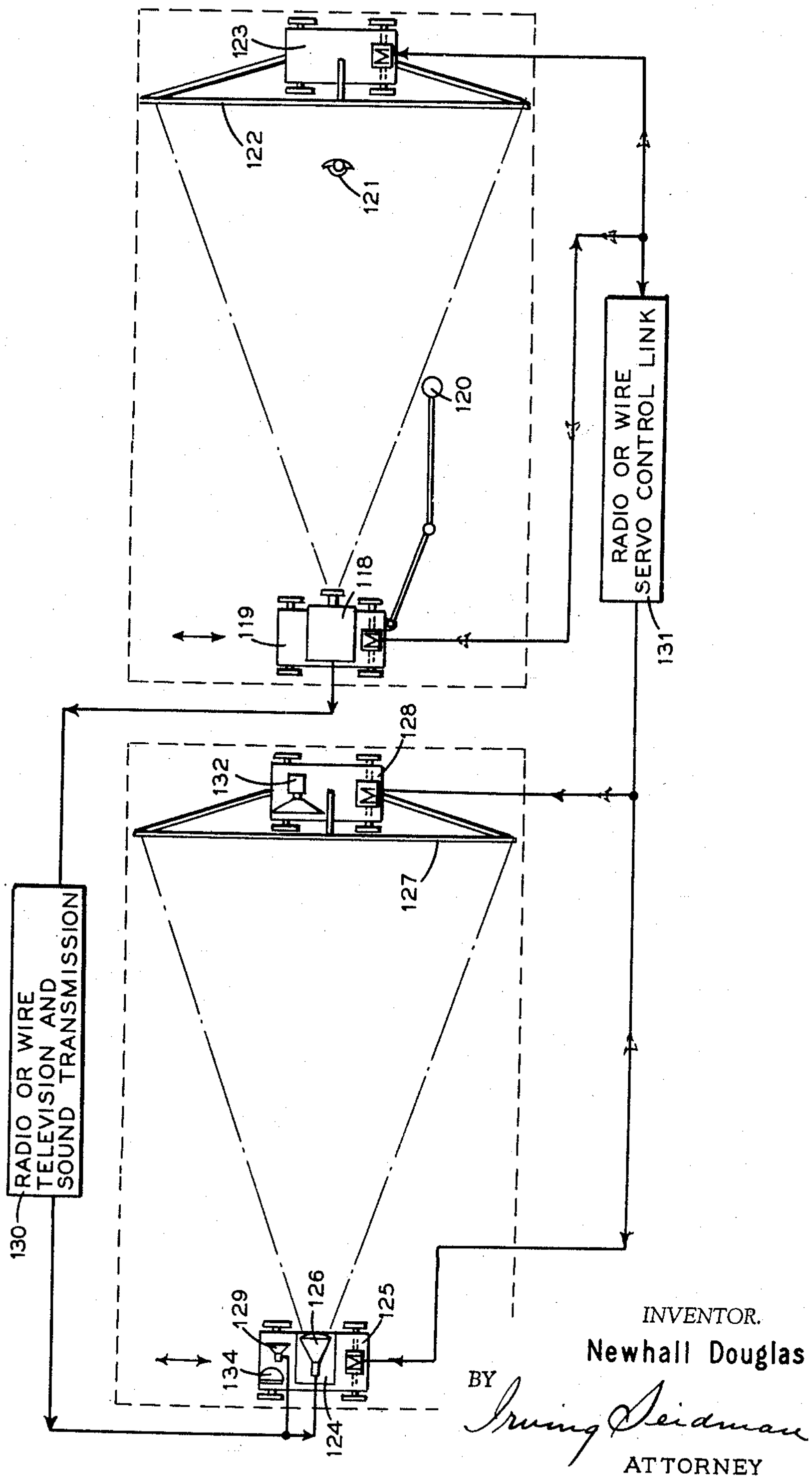

Figs. 8 and 9 together comprise a complete system by which various motions of a first device, such as a camera during the taking of a film, may be recorded, and the record subsequently reproduced to control the movement of a second device, such as a projector, so that the projector, when projecting the film, reproduces the movement of the camera;

Fig. 10 illustrates a modification of the system of Fig. 9 by which any movement of the projector, for example, is controllable alternatively by a record and by manual control, and, if desired, so that a record of the actual movement may be simultaneously made or revised;

Fig. 11 and Fig. 12 are side views of alternative arrangements including a motion picture camera (or a spot-light) together with a projector of still pictures, or of motion pictures, respectively, for projection on a translucent screen to serve as a background for new action. Reproduction of sound to accompany the projected pictures is provided by loudspeakers, and all of the movable compounds may be controlled in response to movement of the camera or spot-light, or by records, or by remote manual controls; and Fig. 13 illustrates the manner in which the invention may be employed in the reproduction of views or scenes by television.

Figure 1:
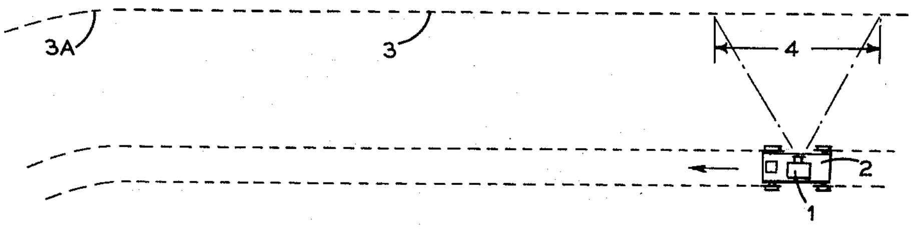
Fig. 1 illustrates a camera taking a scene extending along a straight line and a curved line by "trucking"

A method of taking pictures, known in the moving picture industry as "trucking," is illustrated in Fig. 1. Here the camera 1 supported on truck 2 is rolled along a line, which may be straight, or curved, or both, to photograph an extended scene represented by a straight and curved dotted line 3, 32. The field of view of the camera is represented by the dimension 4.

Figure 2:
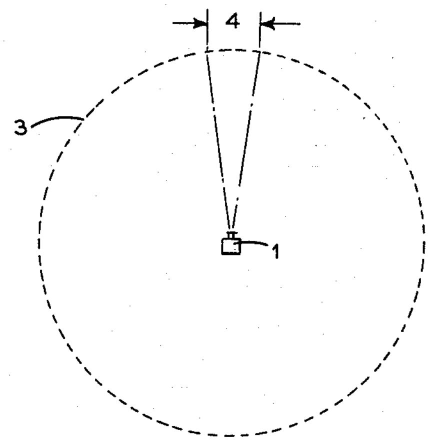
Fig. 2 illustrates a camera taking a scene along a circular line, by "panning"

The method of photographing or making images of a desired scene as illustrated in Fig. 2 is alternative to that of Fig. 1. This method is known as "panning" and involves swinging the taking camera on a pivot, the axis of which is vertical and usually passes through the center of the camera. Covering an extended scene by panning is, as a matter of fact, more generally employed than trucking, mostly because only a fixed tripod having a revolving head is required to support the camera, as compared with the more complicated truck or dolly required for trucking. However, the unnatural effect of reproducing stationary objects so as to appear in motion is exaggerated in the projection of moving picture films taking by panning, because a comparatively small angular motion of the panning camera represents a large peripheral distance swept by the end of the radius extending from the camera to the objects being photographed. Consequently, the use of the present invention becomes even more important in connection with the reproduction or projection of films which are taken by panning the camera.

In projecting a picture in accordance with the present invention, either process just described is repeated, except that the camera is replaced by a projector and the field of view is replaced by a screen. If, then, the projector and the area on which the images are projected are simultaneously moved in the same direction and at the same rate, relative to that of the film, at which the camera was moved at the time the pictures were originally taken, the images on the film will be projected on a succession of fields of view which occupy the same relative positions in space as did the original objects photographed, and stationary objects will appear to be stationary in the projected pictures.

Figure 3:
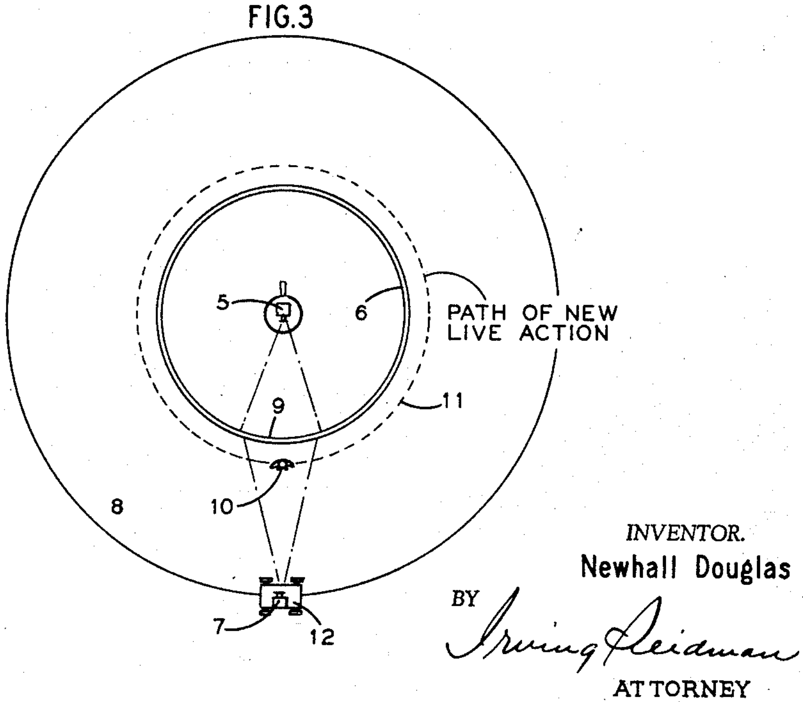
Fig. 3 shows a manually controlled projector employed in projecting pictures (such as might have been taken in the manner of Fig. 1 or Fig. 2) on a circular screen, and a camera simultaneously moving under the control of the projector rephotographing the projected images as a background for an object, in accordance with the invention.

One method of projecting a film in accordance with the invention is illustrated in Fig. 3, wherein a projector 5 is arranged to swing on a vertical pivot in the same manner as the camera 1 of Fig. 2. The pictures or images are projected on a cylindrical screen 6 which, as represented, would be of the translucent type, permitting rear projection. Such projection is preferable in most cases when the projected picture is to be employed as a scenic background, because an object interposed between such background and a camera will not throw a shadow on the background. Front projection, on the other hand, provides greater illumination and, in some instances, the mentioned shadow is not objectionable. Therefore, it is to be understood that the various applications and modifications of the invention herein described are, in general, useful in connection with either front or rear projection on a screen.

In the arrangement of Fig. 3, a camera 7 mounted on a dolly, or the equivalent, can be moved on a circular path 8 concentric to the surface of screen 6. Pursuant to the invention the pictures projected on the screen area 9 should be moved so that the locations thereof correspond relatively to the locations of the respective scenes originally photographed. Since, in order to photograph these areas by a camera 7, it is necessary that the camera be opposite the screen area 9, the camera should be arranged to follow the movement of the projected area on the screen. This can most readily be effected by use of self-synchronous electric generator-motor mechanisms well known in the servo-mechanism art. Other equivalent means, including electronic controls, for moving the camera may, of course, be employed. It is feasible under some circumstances to move the camera (or the projector) manually provided the distance to be covered is not too great.

An object, such as actor 10, may be introduced between the background image on the screen area 9 and the camera 7, and may move, for instance, along the path 11 designated "Path of New Live Action," in front of the moving projected scene which might have been taken by trucking a camera down a street at a "walking speed." If, then, camera 7 moves at a corresponding speed along its path, while photographing actor 10 against the background 9, the pictures taken by camera 7 will, when projected, create the illusion that the actor was actually photographed walking down the mentioned street.

Figures 4, 5, 6, 7:
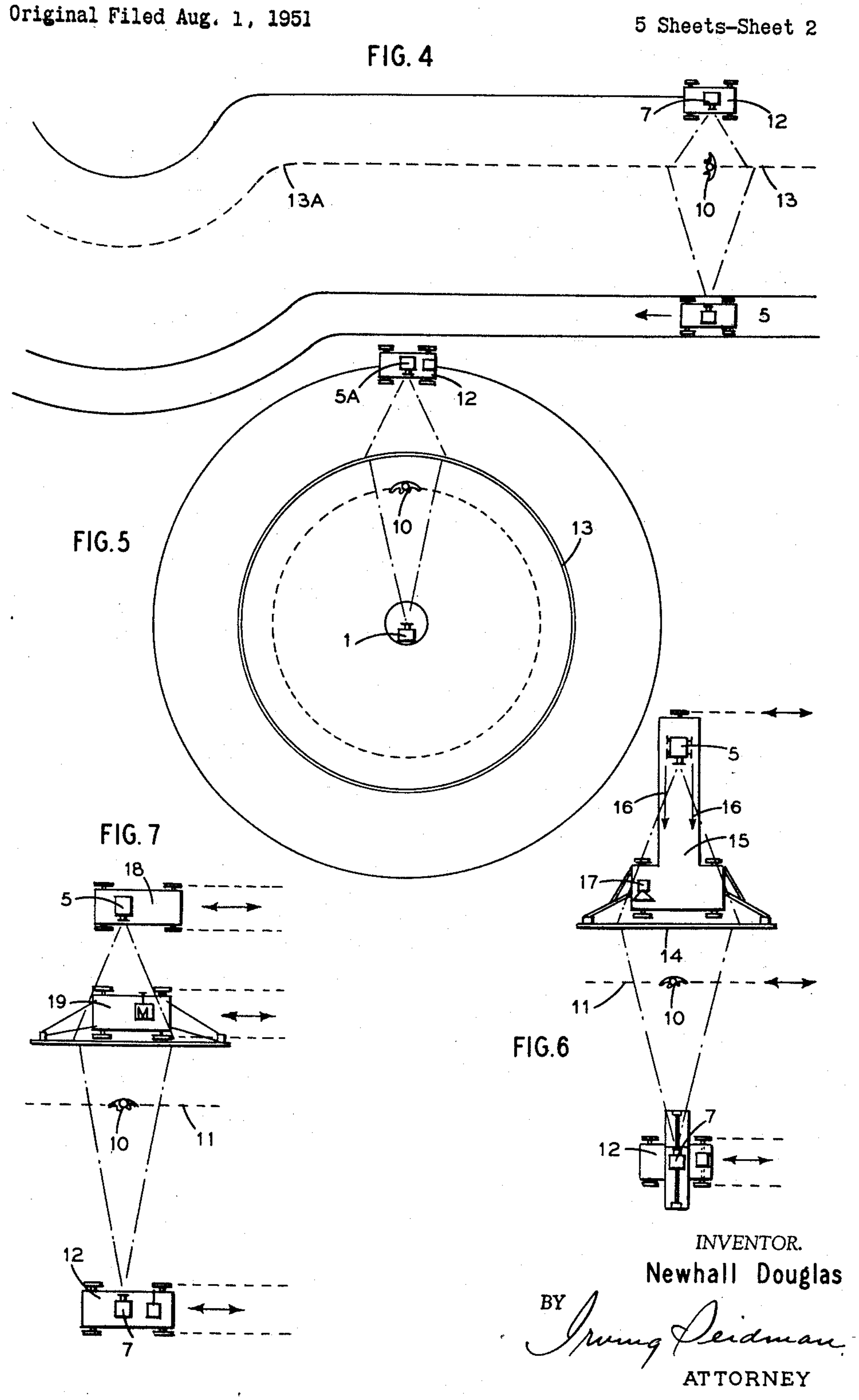
Fig. 4 shows an arrangement of apparatus corresponding to that of Fig. 3, but as an alternative wherein the projector and camera are translated by trucking along a substantially straight line and by panning on a circular line.
Fig. 5 shows a projection system which is the reciprocal of that of Fig. 3, movement of the projector being automatically controlled from the manually controlled camera.
Fig. 6 shows a projector, screen and camera, all arranged for translational movement, wherein the screen is mechanically attached to the projector and the movement of the camera is remotely controlled by the movement of the projector and screen.
Fig. 7 shows an arrangement for translational movement as in Fig. 6, but in this embodiment the screen and the camera are automatically moved by remote control from the projector.

The apparatus of Fig. 4 is arranged for movement along a straight and curved line 13, **13*a* instead of the arc of a circle, as illustrated in Fig. 3. Here, as before, the projector 5 is in a sense the prime mover or driving element, and the camera 7 mounted on a suitable dolly 12**, is arranged to follow it as a driven element, by means of servo-mechanism in the manner previously described. An important distinction between the arrangements of Figs. 3 and 4 is in the type of screen employed. Here, instead of having a large continuous screen which, if desired, could be used, a preferable arrangement includes a small moving screen the nature of which is more clearly illustrated in subsequent Figs. 6, 7, 11 and 12. It will be evident that especially for studio use a small moving screen is preferable because it requires only a small space and is readily moved from one set to another, especially if it be of the independently controlled type as described below in connection with Fig. 7.

As above indicated, Fig. 4 also illustrates that the paths of the projector, camera and screen, may be other than straight, as in the event that the straight portions of the paths are interrupted or terminated by one or more curved portions like 13*a*.

In the alternative embodiment of Fig. 5, the control is reversed with respect to the system of Fig. 4. Also, in Fig. 5, the paths of movement are circular whereas in Fig. 4 they also include straight lines. However, it is to be understood that the shape of the paths with either type of control can be whatever the circumstances require. In fact one of the considerable advantages of the invention is that there are substantially no restrictions on the nature and paths of movement or courses which can be accommodated.

In Fig. 5 the projector 5*a* is mounted, as before, on a motor-driven dolly 12, the motor of which is controlled by the movement of motion picture camera 1, whereby, as the camera is "panned" the dolly with its projector will be automatically moved so that, if desired, the axis of the projector lens remains on the same radius with the axis of the camera lens. The nature of servo-mechanisms adapted to effect the mentioned control of movement, together with further details respecting suitable controls are described below in connection with Fig. 11, the systems of Figs. 5 and 11 being fundamentally the same. The circular, viz., cylindrical, screen 13 is interposed between the projector and the camera, which requires that it be of the translucent type. An actor 10 is represented as standing between the camera 1 and the screen 13, as a result of which the camera which photographs him will simultaneously photograph, as a background, the image on the screen 13 projected from projector 5*a*.

The embodiment of Fig. 6 shows in slightly more detail an arrangement of apparatus based on Fig. 4, although here it is assumed that the motors which drive the camera 7 are controlled from the projector 5. Here, also the screen 14 is attached to a platform 15 on which the projector 5 is mounted. The projector runs on rails 16. Apparatus such as that illustrated in Fig. 6 is especially useful in more confined locations such as studios, since the mechanism is simplified by mechanically attaching the screen to the same platform which supports the projector so that the screen automatically moves with the projector.

It will be noted that a loudspeaker 17 is mounted on platform 15 so as to move with the screen, thus providing sound effects which move with the background pictures. The rails 16 on which projector 5 is movable toward and away from screen 14 permits change of the area of the projected pictures. If the area of the projected pictures is to be enlarged, the distance between the projector and the screen may be effectively increased without extending beyond the limits of a studio of reasonable size by employing pairs of intervening mirrors or reflecting prisms in a manner known in the optical art.

The apparatus illustrated in Fig. 7 is essentially the same as that shown in Fig. 6. The principal differences comprise a simplification of the mechanical apparatus and a slight elaboration of the electrical apparatus required. Here the projector and screen, each, are mounted on separate carriages or dollies, 18 and 19, respectively, the camera 7 being mounted on its dolly 12. Dollies 12 and 19 are each operated by a separate motor, M, preferably of the servo type, as before, so that they automatically follow the movement of projector dolly 18.

In describing above the movements of the principal elements of the apparatus employed in connection with the invention, including the means for controlling them, reference has been made to well-known types of servo-mechanisms. In many cases such mechanisms, of the type initially activated manually, are sufficient in practicing the present invention, but in other cases it is desirable that the control of the moving components be entirely automatic. Therefore, the invention includes means by which all of the movements of the projectors, cameras and screens, as described in connection with Figs. 3–7, inclusive, may be automatically controlled to be correct for any given film. Thus, such automatically controlled movements may be repeated indefinitely. A system of that nature is illustrated in block diagram form in Figs. 8 and 9.

In accordance with the invention, the several movements which are to be automatically repeated are first recorded, as shown in Fig. 8, and then the records of the motion are reproduced as control signals which, in turn, effect the reproduction of the original motion, as illustrated in Fig. 9. It will be evident that such a system has a wide range of general application, but the invention is here described only in connection with the control of cameras, projectors and related apparatus.

Referring to Fig. 8, a camera 20 is shown to be mounted on a base 21 which, in turn, is pivoted on a horizontal axle 22. This axle, in turn, is journalled in members 23 which are secured to rotating plate 24. Plate 24 rotates on a vertical pivot anchored in post 25. Thus it will be seen that camera 20 may be swung by means of handle 26 on a vertical and on a horizontal axis. If desired, movement about a second horizontal axle at right angles to axle 22, could be provided. Post 25 is secured to dolly 27 which is steerable by means of pivoted axle 28, permitting the dolly to follow any desired path. It is to be understood that the mechanism just described is represented by way of example only, since different but equivalent mechanism may be substituted.

The tilting movement of the camera 20 rotates gear 29 which is mechanically coupled to a moving element connected in tilting oscillator 30, later to be described. Similarly, gear 31 is coupled to panning oscillator 32 and gear 33 is coupled to dolly-steering oscillator 34. Finally, wheel 35 on the rear axle of dolly 27 is mechanically coupled to a moving element in dollying oscillator 36. The purpose of the oscillators 30, 32, 34 and 36 is to convert the various mechanical movements of the camera 20 and the dolly 27 into signals capable of recording. Because of their flexibility, electric recording and reproducing systems are here represented, although equivalent apparatus could be substituted. The mentioned oscillators may comprise a type of which the output can be varied by means of the mechanical movement of an element thereof, such as a capacitor or an inductance, or of an element connected thereto. For example, the output of the "oscillator" may be varied with mechanical motion of the movable element in respect to amplitude or frequency to form a signal. The output signal of each oscillator is, in turn, after amplification if necessary, recorded on a recording device here represented by recorders 37, 38, 39 and 40. Suitable recorders are well-known in the art, such as magnetic tape recorders, disc recorders, and film sound-track recorders, all of which types are employed in the photograph, radio and motion picture industries. Magnetic tape recorders are presently preferred for the purposes of this invention.

From the foregoing description of the invention it will be understood that one or more records of movements followed by the original taking camera can be made simultaneously with the taking of the film. It is here assumed that this film is of the motion picture type. If, during the taking of a motion picture film, the film speed is changed, a record of the film speed can also be made and utilized as described in connection with the other movements of the camera.

Assuming that records of the four described movements have been made, these records may be "played" or reproduced to effect a duplication (in corresponding mechanism) of control of the movements of the original members. A system for such reproduction of movements is illustrated in Fig. 9 wherein a projector 5 is mounted on a base 21*a* and this base is supported, in turn, on members which correspond to those shown in Fig. 8 and which are correspondingly designated.

The several movements of the projector and its mounting mechanism are individually controlled by driving motors 41, 42, 43 and 44, all suitably coupled mechanically to the elements which are to be respectively driven thereby. Four play-back units 45, 46, 47 and 48 are provided to reproduce the records made, respectively, by recorders 37, 38, 39 and 40. These units may also be of types well-known in the recording art and may include output amplifiers or other auxiliary equipment necessary to control the movements of motors 41—44 in either direction. These motors are, as shown, mechanically coupled to the respective moving elements so that the elements will move under the control of signals from the reproduced records, thus controlling the direction and rate of movement.

In order to provide control of position it is necessary, with the system as illustrated in Fig. 9, to include an element which is position-sensitive. To this end, oscillators 30*a*, 32*a*, 34*a* and 36*a*, which may be similar to those correspondingly numbered in Fig. 8, are provided to generate signals representing the movements or positions of the corresponding moving elements coupled thereto by way of gears 29*a*, 31*a*, 33*a* and dolly wheel 35*a*. The output signals from the oscillators of Fig. 9 are fed into "position control servo-mechanisms" 49, 50, 51 and 52, respectively. In each servo-mechanism, the signals from the oscillator and from the play-back unit connected thereto are balanced in a well-known manner when the position of the projector 5 is the same as that of the camera 20 (Fig. 8) in respect to any given seciton of film. If the position of the projector does not correspond to that of the taking camera, then the error signal from the respective oscillator of Fig. 9 will, when combined with the signal from the interconnected play-back unit, produce a resultant signal which will move the driving motor connected to receive such signal (or an actuating current proportional thereto) as required to move the proper element of the projector-mount mechanism to the correct position. Other methods, which may be substituted, of providing check-back signals to assure accurate position controls are known in the art.

From the above explanation and description it will be evident that as many movements of the equipment as desired may be controlled automatically from a record in accordance with the present invention. Furthermore, movements of other types of equipment such as projection screens, loudspeakers, microphones, etc. may be controlled in the manner described in connection with the systems of Figs. 8 and 9. Thus, any apparatus or properties in a studio, for example, may be automatically moved from one position to another in accordance with the requirements of a film or television sequence, or for any other purpose.

Especially if the control system of the present invention involves the control of the movements of several different mechanisms, such as represented in Figs. 9, 11 and 12, for example, it is usually desirable to provide a manual control in addition to the exclusively automatic control illustrated in Fig. 9. Again, it frequently happens that the record made in the manner of Fig. 8 is incorrect or for other reason requires alteration. In such case the alternative embodiment of Fig. 10 can be substituted in the system of Fig. 9.

In the embodiment of Fig. 10, a manual voltage control 53 is connected to motor control 54 so that the motor can be independently actuated in either direction at any desired rate. Such motor control may be included in the "Position Control Servo-Mechanism" 52, for example, or comprise a separate unit connected to the unit 52. The output of the motor control or of the servo-mechanism is then connected as before to the driving motor 55, which, for example, may be the same as motor 43 of Fig. 9. Motor 55 is connected to power a drive wheel 56 which in the selected example corresponds to drive wheel 35*a* of Fig. 9. On the same shaft with drive wheel 56 is an idler wheel 57 which, as before corresponds to idler dolly wheel 58 of Fig. 9. If an oscillator 59 be now coupled to wheel 57 (Fig. 10) in the manner that wheel 35*a* is coupled to oscillator 36*a* of Fig. 9, the output of the oscillator can be caused to be proportional to the movement of the wheel coupled thereto as previously described. The output of the oscillator can, as before then be recorded in the manner described in connection with Fig. 8. In this manner the movement of any element of the mechanism can be recorded in whole or in part, while the movement of the mechanism is under the control of a record reproduced by play-back unit 60 or by manual control 53, or by the signal from the play-back unit 60 as modified by the manual control 53. The system of Fig. 10 is especially useful in correcting or modifying a record made as described in connection with Fig. 8. If, for example, the record involved is of the magnetic tape type, a run can be made with the movement of the mechanism controlled by a record reproduced by unit 60 and the resulting movement observed. Then whenever it is desired to alter the movement from that provided by the record, the correct movement is effected under manual control 53, while the play-back unit 60 is disconnected or incapacitated. The modified movements are thus recorded on a magnetic tape by recorder 61 and thereafter the portion of corrected or modified record so recorded is substituted for the incorrect portion of the record. This means of modifying the record permits many special effects such as changing the trucking rate of the projector to change the apparent velocity of an object moving in front of the background, adapting images taken by panning the camera to trucking projection, and vice versa, and many others which will suggest themselves. In addition it permits making a record "synthetically" merely by recording the movements of a moving element such as wheel 57, in response to manipulation of manual control 53.

The dotted lines between manual voltage control 53, recorder 61 and motor control 54 indicate further flexibility in operation of the system of Fig. 10. For instance, if the output of the manual voltage control is connected to recorder 61, or to another similar recorder, an instantaneous record can be made of the actual control signals to the motor control 54 instead of making the record more indirectly by recording the movement of wheel 57, by way of oscillator 59. If the "Recorder" includes a reproducer head, as is usual in tape and wire recorders, the record can immediately be used to control motor 55 by the mere throwing of a switch. Also, the "synthetic" record mentioned above, can be made directly from the manual voltage control without operating the motor, if motor control 54 be disconnected from manual control 53.

Fig. 11 and Fig. 12 illustrate two practical embodiments incorporating most of the features of the invention above described. In these figures the same or corresponding elements or components are similarly designated. Referring to Fig. 11, a translucent screen 62 is represented in cross-section. To the rear of the screen is a projector 63 mounted on a motor-driven dolly 64. Also behind the screen is a loudspeaker 65, mounted on a motor driven dolly 66. In front of screen 62 is shown a stage 67 on which desired action can take place. In the present example it is assumed that the screen together with the associated apparatus is designed primarily for movements along a straight or curved line, as described in connection with Figs. 3–7, inclusive, although this is not intended as a limitation, because movements in at least two dimensions are usually required. Different types of movement require different types of dollies, but for simplicity of explanation it may be assumed here that the movements are along a substantially straight line, such, for example, as might represent a street. In this case, the stage 67 might be of considerable length and screen 62 would be arranged to move along behind it. For this purpose screen 62 is suspended from a motor-driven dolly 70 which runs on tracks 71. Suspended from the same dolly is a microphone 72 which thus will move with the screen so as to be always within acoustic pickup range of action on the stage in front of the screen.

A camera 68 mounted on a motor-driven dolly 69 is positioned in front of the stage so as simultaneously to photograph object or action on the stage and images projected on screen 62 as a background.

By means of servo-mechanism control equipment 73 it is possible in accordance with the invention to control the movements of the projector 63, the loudspeaker 65 and the screen 62 together with microphone 72 automatically to follow movement of camera 68, in the manner described in connection with Figs. 6 and 7, for example. Alternatively, any or all of these movements of camera 68 may be controlled by one or more records, the control signals from which are connected to servo-mechanism 73 through suitable terminals symbolically represented by terminals 74.

Alternatively, the arrangement of Fig. 11 includes manual controls 75 by which the movements of the projector, projector film, loudspeaker, screen and camera can all be manually controlled individually, or by unicontrol in groups, from a remote station. Complete flexibility of control is thus provided. In this connection it may be explained that the solid arrows representing connections from the servo-mechanism 73 to the individual elements or units of apparatus represent the automatic control of such units in response to movement of camera 68, whereas the dotted arrows indicate the alternative control of the movement of camera 68 by signals from a record as described in connection with Figs. 8 and 9, or manually by control 75.

The invention also contemplates the combined or simultaneous use of a plurality of cameras and projectors. Such projectors can, when controlled as herein described, produce many novel effects. For example, a plurality of motion and of still pictures can be taken from various aspects, simultaneously; or a motion picture can be projected superimposed on a panoramic picture or on other motion pictures, and the locations of projection areas and the movements of such areas controlled manually or automatically. Also, projectors arranged to project duplicate films can be simultaneously operated from different positions so as to repeat the same scene or scenes on different projection areas or on the same area or areas in succession. The latter method of repetition is frequently useful in connection with demonstration and educational programs.

The representation of the motion picture camera 68 in Fig. 11 also includes a "Spotlight" in order to indicate the versatility of the invention. For example, in theatre or television productions, it is frequently necessary to follow the actor, such as a dancer on the stage with one or more spotlights from above. Thus by the mere substitution of a spotlight for each camera 68, leaving the remainder of the system as shown, the projector 63 and the screen 62 on which a background is projected will follow the dancer automatically in response to manual or other control of the movements of the spotlight or spotlights.

The features of the system of Fig. 11 are repeated in the modification of Fig. 12. Most of the differences in Fig. 12 result from the fact that the projector 76 is of the motion picture type which, according to the invention, should be arranged to move in the same manner that the motion picture camera moved when taking the film which is projected. As already mentioned, the principal advantage of thus moving the projector is to cause the projected images of objects stationary when photographed to appear stationary in the projected pictures. However, if under unusual circumstances, the stationary objects when photographed were so far from the camera or otherwise so insignificant that apparent motion of them in the projected picture would not be undesirable, it would not be necessary to move the projector exactly in the same manner that the camera was moved. Again, for certain scenic effects it might even be desirable that stationary objects be projected so as apparently to move.

As in the case of the systems of Figs. 3, 6 and 7, the movements of the camera and the screen and loudspeaker of Fig. 11 would be controlled by the motion picture projector 76, except in the event that the controls are assumed by a record, or records, connected at terminals 74, or by manual controls 75. For the latter purpose dolly 64 of the projector is powered by a motor M which is, as in all of the other instances, represented symbolically because, as was explained in connection with Figs. 8 and 9, as many movements as may be required may be controlled by separate motors.

As in the system of Fig. 11, a screen 62 (Fig. 12) is shown to be suspended from a dolly 70 movable by a motor M on tracks 71, and, as before, a microphone 72 is also attached to the same dolly. In this case, however, a second loudspeaker 78 is attached to the dolly 70 so as to move with it. Thus speaker 78 will always move in alignment with screen 62, whereas speaker 65 may be independently movable to produce any desired additional sound effects, as for example if an additional source of sound is required to move or be displaced with respect to the image on the screen. Additional loudspeakers of which the movements are likewise remotely controlled, either manually or by signals from records, or in response to servo-mechanism, may obviously be provided in any of the systems herein specifically described.

It has already been mentioned that in many respects the present invention is as readily applicable to television apparatus and projection systems as to strictly photographic apparatus and projection systems. The television system of Fig. 13 will be seen to correspond fundamentally to many of the preceding figures, especially insofar as the interconnection and intercontrol of movements is concerned. More especially, the system of Fig. 13 is really a modification of that of Fig. 12.

Fig. 13 illustrates a television camera 118 mounted on a dolly 119 which, in turn, is driven by a motor M. It is assumed that a suitable television transmitter is associated with camera 118. This camera may be assumed to be employed in a television studio, and, therefore, to include a microphone 120 also supported on dolly 119. An actor 121 is represented as standing in front of a background screen 122 which, like the background screens previously described, is also supported on a dolly 123 which is driven by a motor M. This screen may comprise painted scenery or preferably be of the type above described upon which suitable background pictures are projected in accordance with the present invention as described above. For example, the film thus projected may have been made simultaneously with a record of the movements of the taking camera, as in Fig. 1.

At the left side of Fig. 13 a television receiver and projector 124 are shown also mounted on a dolly 125. This dolly carries a loudspeaker 129 and thus moves with dolly 125 which is driven by motor M. On this dolly a seat 134 is represented to indicate that an observer may be transported on the dolly so that he will always face in the direction in which the pictures are projected. He may have at his side a control box, like 75 of Fig. 12, with which remotely to move the camera, projector and screen.

If receiver and projector 124 are of the common type employed in homes, the reproduced images will appear on the projection surface or face of tube 126. However, if large screen projection be desired, tube 126 will be of the projection type, and in this case a screen 127 will be required. This screen may, as before, be mounted on motor driven dolly 128, as shown. A second loudspeaker 132 is mounted on this dolly and may be used in the place of speaker 129 in connection with pictures projected on screen 127. The type of movements represented in Fig. 13 are solely illustrative, it being understood that any or all of the movements and the control thereof already described in connection with motion picture systems can be employed in connection with a television system.

The interconnections between the transmitting and receiving portions of the system of Fig. 13 are represented in block diagram form. The block 130 is labeled to indicate that in accordance with current practice the transmission of television and accompanying sound signals may alternatively be by radio or wire, the choice being one of convenience and in either event not being a part of the present invention. The interconnections between the four motors M represented in Fig. 13 is shown to comprise a servo-mechanism such as any of those heretofore referred to. However, in this instance it is to be understood that the actual interconnections may be either by wire or by an equivalent radio link in a manner known in the radio communications and control art, depending largely upon the distance between the transmitting and receiving equipment.

In view of the descriptions in connection with the preceding figures it will be observed from Fig. 13 that as a result of the controls indicated by the solid arrows the movement of the television camera 118 will control the movement of screen 122 as a background for the actor in the manner already explained in connection with motion picture photography, and by virture of the interconnecting servo-mechanism link 131 will also control the movement of the projector 126. In this manner the images or pictures of the objects projected on a screen will assume positions which correspond to the positions of the objects televised.

An alternative and important feature of the system of Fig. 13 results from a reversal of the controls of movement such as were described above in connection with Figs. 7 and 12. (In fact, the arrangements of Figs. 4, 6, 7 and 11 could as well comprise television systems if the cameras and projectors there shown were replaced by equivalent television components after the manner of Fig. 13.) Here, however, because a television system provides instantaneous pickup and projection it becomes possible for the viewer or observer on seat 134, himself to select the field of view reproduced in the projected images, as well as to be in correct orientation with respect to the subject matter on the screen. Such embodiment and use of the equipment of Fig. 13 is represented by the dotted arrows. Thus by employing suitable servo-mechanism it is possible to control the movement of television camera 118 remotely from the television receiver 124 so that by moving that receiver or projector tube, pickup or television camera 118 will move proportionally to pick up any desired objects within possible view of the camera within its range of movement. The images projected by television and the apparent movements of objects therein may, as with motion pictures, be enlarged or reduced, automatically maintaining correct relative proportions and orientations between the position of the observer of the projected pictures and the positions of the objects in such pictures.

Alternatively, the projector tube as well as the camera may be connected to follow the manual movement of the screen, which thus would comprise the prime mover. In this manner the original locations of objects televised may be reproduced as picture images which occupy the same relative locations on a projector screen, just as described in connection with motion pictures. For example, objects which might lie along an extended line, or alternatively, say, to the north, east, and south of a panning camera, or both, will be reproduced along a similar line, or to the north, east and south, on a screen, which may be superimposed or adjacent to a map or a model, and in any scale, reduced or enlarged. Additionally, it frequently is desirable to view one or more objects from different directions, and, by means of the invention, this is now possible.

Since the driving motors controlling movements of the various elements of Fig. 13 are all connected together by servo-mechanism, or the equivalent, it is possible to control the movements of one or more thereof from a record representing the movements of the camera which took the film projected on screen 122. Hence Fig. 13 is a part of a system including Figs. 1 and 8, for example.

Obviously, by employing multiple equipment, as much of the scene as required can be projected at the same time. It will be evident that such a system has wide application both in the commercial, educational and entertainment fields.

While a specific embodiment of the invention has been shown and described in detail to illustrate the application of the invention principles, it will be understood that the invention may be embodied otherwise without departing from such principles.

What is claimed is:

1. The method of reproducing scenes as picture images by television, which includes, optically scanning a scene which is a portion of a total field by a television camera, transmitting the scanned images by television signals, receiving the signals and reproducing the signals as images on a projection surface relatively corresponding to said total field, moving a projector relatively to said screen to project on said screen different scenes forming fractional parts of said total field of view and remotely controlling the position of said camera in response to movements of said projector so that the fields of view scanned by said camera occupy relatively positions in space as viewed by the eye of an observer through the lens of said camera, corresponding to those occupied by said images on said projection surface, as viewed by the eye of an observer through the lens of said projector.

2. The method of reproducing scenes as picture images, which includes, optically scanning the scenes by moving a television camera so as to cover different portions of a given total field of view, transmitting the scanned images by television signals, receiving the signals and reproducing the same as images, superimposing the projected images on a map representing said given total field of view, projecting said images on said map by a projector, moving said projector in response to the movement of said camera so that the scenes projected on said map, as viewed by the eye of an observer through the lens of said projector, occupy the same relative positions in respect to said map as are occupied by said portions with respect to said total field of view as viewed by the eye of an observer through the lens of said camera.

3. The method of reproducing scenes as picture images by television, which includes, optically scanning the scenes by moving a television camera so as to cover different portions of a given total field of view, transmitting the scanned images by television signals, receiving the signals and reproducing the same as images, projecting said images by a projector, superimposing the projection surface reflecting said images on a larger surface composed of a map representing said given total field of view, moving said projection surface and said projector to correspond to the movement of said camera so that the images projected on said surface, as viewed by the eye of an observer through the lens of said projector, occupy the same relative positions in respect to said map as are occupied by said portions with respect to said total field of view as viewed by the eye of an observer through the lens of said camera.

4. The method of reproducing scenes as picture images by television, which includes, optically scanning the scenes by moving a television camera so as to cover different portions of a given total field of view, transmitting the scanned images by television signals, receiving the signals and reproducing the same as images, projecting said images by a projector on a screen adjacent to a map of said field, moving said surface and said projector to correspond to the movement of said camera so the images projected on said screen, as viewed by the eye of an observer through the lens of said projector, occupy the same relative positions in respect to said map as are occupied by said portions with respect to said total field of view as viewed by the eye of an observer through the lens of said camera.

5. The method of reproducing scenes by television on a screen as pictures so that the images of objects in the scenes have the same spatial relationships as did the original objects and so that objects if stationary in the original scenes appear as stationary images in the pictures on the screen, which comprises taking the scenes by a television camera, while moving the television camera to cover different fields of view, recording the pictures taken, reproducing the pictures by projecting the pictures by a movable projector on a movable projection screen, moving said projector during said projection so that the projected images occupy positions in space, as viewed by the eye of an observer through the lens of said projector, corresponding to those occupied by the original objects as viewed by the eye of an observer through the lens of said camera, generating signals in response to and corresponding to the movements of the projector, and automatically controlling by said signals the movement of said screen so that the projected images fall on said screen regardless of their spatial positions.

6. The method of reproducing scenes on a television screen so that the projected images of objects in the scenes have the same spatial relationships as did the original objects and so that objects if stationary in the original scenes appear as stationary images in the projected picture, which comprises photographing the scenes by a television camera while moving the camera to cover different fields of view, recording the images, transmitting the images to a television receiver, reproducing the images on a screen, moving the receiver during said reception so that the said images occupy positions in space, as viewed by the eye of an observer on said television receiver, corresponding to those occupied by the original objects as viewed by the eye of an observer through the lens of said camera, generating signals in response to and corresponding to the movements of the receiver, recording said signals, reproducing said images by a movable motion picture projector on a screen, reproducing said signals in the form of control currents and controlling by said currents the movement of said last mentioned projector so that the images appear on said screen.

References Cited in the file of this patent

UNITED STATES PATENTS

| | | |
|---|---|---|
| 2,014,435 | Jackman | Sept. 17, 1935 |
| 2,030,300 | Jackman | Feb. 11, 1936 |
| 2,073,370 | Goldsmith | Mar. 9, 1937 |
| 2,150,543 | Ybarrondo | Mar. 14, 1939 |
| 2,359,032 | Gott | Sept. 26, 1944 |